United States Patent [19]

McColl

[11] Patent Number: 4,994,798
[45] Date of Patent: Feb. 19, 1991

[54] MULTIPLEXED SURFACE ACOUSTICAL WAVE APPARATUS

[75] Inventor: James R. McColl, Concord, Mass.
[73] Assignee: GTE Laboratories, Inc., Danvers, Mass.
[21] Appl. No.: 399,133
[22] Filed: Aug. 28, 1989
[51] Int. Cl.$^5$ .................. H04Q 1/39; H01L 41/107
[52] U.S. Cl. .................. 340/825.540; 310/313 D; 333/195
[58] Field of Search .............. 333/151, 193, 195, 196, 333/194, 153; 340/825.61, 825.54, 825.31, 310 R; 73/703, 723; 310/313 D; 342/51, 50

[56] References Cited

U.S. PATENT DOCUMENTS

| | | | |
|---|---|---|---|
| 3,889,065 | 6/1975 | Alsup | 179/15 BC |
| 4,096,477 | 6/1978 | Epstein et al. | 343/6.5 SS |
| 4,265,124 | 5/1981 | Lim et al. | 73/703 |
| 4,442,515 | 4/1984 | Meidzler | 340/310 R |
| 4,737,789 | 4/1988 | Nysen | 342/51 |
| 4,746,830 | 5/1988 | Holland | 310/313 D |

Primary Examiner—Donald J. Yusko
Assistant Examiner—John E. Giust
Attorney, Agent, or Firm—Salzman & Levy

[57] ABSTRACT

An apparatus is featured for controlling remote devices. The status or one or more switches associated with remote devices may be transmitted along a single transmission line. One end of the transmission line contains a surface acoustical wave (SAW) delay line. The SAW delay line responds to an interrogation pulse of radio frequency electromagnetic energy with a series of delayed pulses, each of which transmits the status of a switch by means of the presence or absence of the pulse. The SAW delay line and switches are completely passive, requiring no power source. The transmission line may optionally be interrupted and coupled by means of a pair of inductive coils. This offers the potential for rotation, as within a steering column of an automobile, without wear or damage to the transmission line. The other end of the transmission line contains electronic circuitry to provide the interrogation pulse, to decode the return delayed pulses, and to drive other circuitry as required by the switch positions.

20 Claims, 2 Drawing Sheets

MULTIPLEXED SURFACE ACOUSTICAL WAVE APPARATUS

Related Applications

This application is related to co-pending U.S. patent applications, as follows: U.S. patent application Ser. No. 07/483,349 (now allowed), filed FEb. 20, 1990, titled CODED SURFACE ACOUSTICAL WAVE (SAW) MOTOR VEHICLE SECURITY DEVICE; U.S. patent application Ser. No. 07/276,072, filed Nov. 25, 1988 (Attorney Docket No. 88-3-515), titled SPURIOUS SIGNAL CORRECTION FOR SURFACE ACOUSTIC WAVE (SAW) SECURITY DEVICES, now U.S. Pat. No. 4,945,354; and U.S. patent application Ser. No. 07/399,126, filed Aug. 28, 1989 (Attorney Docket No. 89-2-381), titled EASILY ENCODABLE SURFACE ACOUSTIC WAVE, (SAW) SECURITY DEVICES; and hereby incorporates by way of reference all of the teachings and description therein.

BACKGROUND OF THE INVENTION

1. Field of the Invention

The present invention relates to apparatus for digitally multiplexing a plurality of remote, electronically operative devices, and more particularly to a multiplexed apparatus utilizing a surface acoustical wave system.

In an electrical system featuring a number of diverse electronically operated devices, it has been found necessary to locate the switch controls at a remote location. Such a system is frequently to be found in automobiles, wherein the horn, directional signals, lights, wipers, etc., are all controllable from a wand mounted upon the steering wheel column. Other automotive functions such as oil pressure, water temperature and vehicular speed are usually mounted upon a single panel or dash.

In such cases, it may be expensive or inconvenient to provide an individual transmission line to each device or switch. In the aforementioned motor vehicle steering wheel example, manufacturing and reliability problems are posed by passing a great number of wires up a steering column to a rotating member. In such cases, it can be desirable to employ a multiplexing technique whereby the status of more than one switch can be transmitted using a single transmission line. Means such as time division multiplexing, frequency division multiplexing, and packet transmission are well known to those skilled in the art of electrical communications. These well known multiplexing methods require that sophisticated electronic circuits requiring power be installed at both ends of the transmission line.

It would be desirable to replace the electronic circuitry at one end of the transmission line with a passive component not requiring power. Using the steering wheel and tire pressure sensor switch as examples, it would also be desirable to have a simple and reliable means to transmit such data using a noncontacting connector with freedom to rotate.

The present invention has developed a system that can control and/or interrogate remote, electronically operative devices. A single transmission line can carry multiplexed digital information to a pair of coupling inductive coils. One of the coils is associated with a programmable surface acoustical wave device.

A surface acoustical wave transponder that responds to an interrogating pulse with a delayed sequence of pulses, and a circuit for comparing the proper pulse sequence is described in the, aforementioned U.S. patent application Ser. No. 07/483,349. The circuit described therein (see FIG. 8) can be utilized in the present invention to differentiate between switching signals for the remote devices, which switching signals are propagated as reflected surface acoustical waves from the programmable transducers of the SAW device located within the steering wheel column.

SUMMARY OF THE INVENTION

It is an object of the present invention to obviate the disadvantages of the prior art.

It is another object of this invention to provide a multiplexed SAW apparatus for interrogating and/or controlling a number of remote devices.

It is another object of the invention to provide a passive SAW system for controlling or interrogating a number of remote devices.

It is a further object of this invention to control or interrogate remote devices without direct electrical e connection, utilizing a coil coupled SAW device.

These objects are accomplished, in one aspect of the invention, by the provision of a multiplexed apparatus for controlling and/or interrogating a number of remote devices. A SAW transponder contains an interface transducer and a plurality of programmable SAW reflectors disposed upon a piezoelectric substrate.

An interrogating signal is imparted to the SAW transducer either by direct connection to a signal source by means of a cable or by means of inductive couping coils. The electrical interrogating signal is converted to SAW energy by means of the SAW transducer and travels along the surface of a peizoelectric substrate such as lithium niobate. Upon encountering a programmable reflector, the SAW energy either passes unimpeded or a portion of its energy is redirected back towards the SAW transducer, depending on which function has been programmed into the reflector.

The programming of the transducer is accomplished by setting an electrical switch to the open or closed position. The reflected SAW energy reaches the SAW transducer after a delay time and is reconverted to electrical energy which can then be interpreted by electronic circuitry. The individual reflectors are distinguished by the unique time of the transponded pulse produced by each reflector.

BRIEF DESCRIPTION OF THE DRAWINGS

The aforementioned and other objects of this invention will become more apparent and will be better understood with reference to the following detailed description considered in conjunction with the accompanying drawings, in which.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Generally speaking, the invention relates to a multiplexed apparatus for interrogating the status of a number of switches and/or a number of remote devices. The apparatus features a SAW device having a number of programmable or switchable transducers. By means of opening or closing a respective switch associated with each one of the programmable transducers, the transducers are caused to change their acoustical wave state between a first normally non-reflective surface acoustical wave state, and a second reflective surface acoustical wave state.

Remote devices respectively associated with each transducer can thus be controlled and/or interrogated by programming the transducers to be in either one of the two operative states.

For the purpose of brevity like elements will have the same numerical designation throughout the figures.

Figure 1:
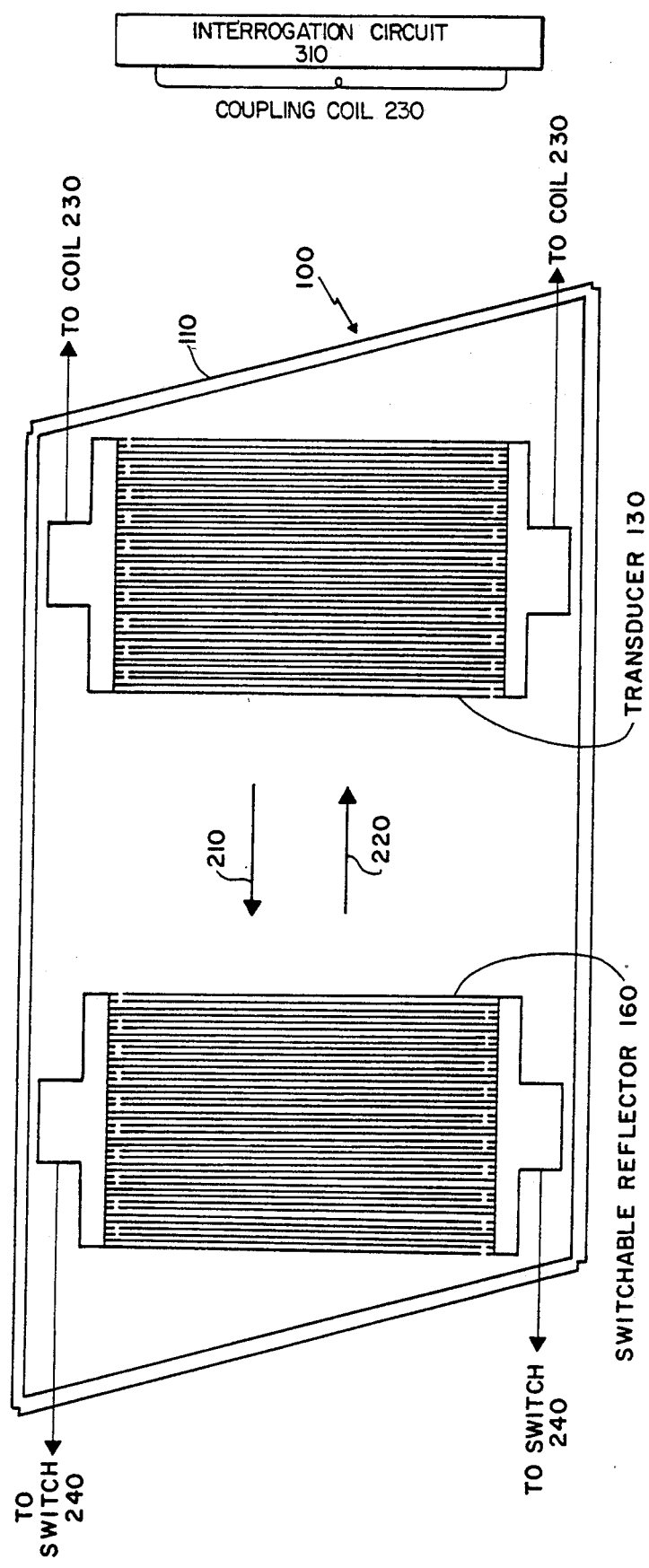
FIG. 1 is a plan view of transponder constructed in accordance with the principles of this invention.

Now referring to FIG. 1 an example of a SAW transponder 100 is shown comprising a piezoelectric substrate 110, in accordance with the present invention. In the figure, transducer 130 disposed on substrate 110 is connected to an inductive coil 230, preferably designed so that its inductance resonates with the capacitance of the transducer in accordance with well known principles. A so-called "split electrode" transducer design is shown in FIG. 1, with electrodes spaced at quarter acoustic-wavelengths of the fundamental SAW frequency. It is also possible to employ a so-called "single electrode" transducer in which each split electrode is replaced with a single unsplit electrode spaced at half acoustic-wavelengths of the fundamental SAW frequency. When excited by an interrogation pulse, transducer 130 launches SAW 210 towards the switchable reflector 160.

The switchable reflector 160 disposed on substrate 110 in FIG. 1 is also a "split electrode" transducer. It may or may not have the same number of electrodes as transducer 130. The switchable reflector 160 has a property by which it is able to transmit SAW's without reflection, when it is shorted by a closed switch 240. However, if the switch is opened, the switchable reflector becomes partially reflecting, creating a reflected SAW 220 which can be transduced to electromagnetic energy and retransmitted by transducer 130 to coil 230. The switchable reflector may also be constructed from a "single electrode" transducer, but the role of the switch may be reversed; that is, shorting the switch 240 may lead to reflection and vice versa. The "split electrode" configuration is preferred for the switchable reflector.

Figure 2:
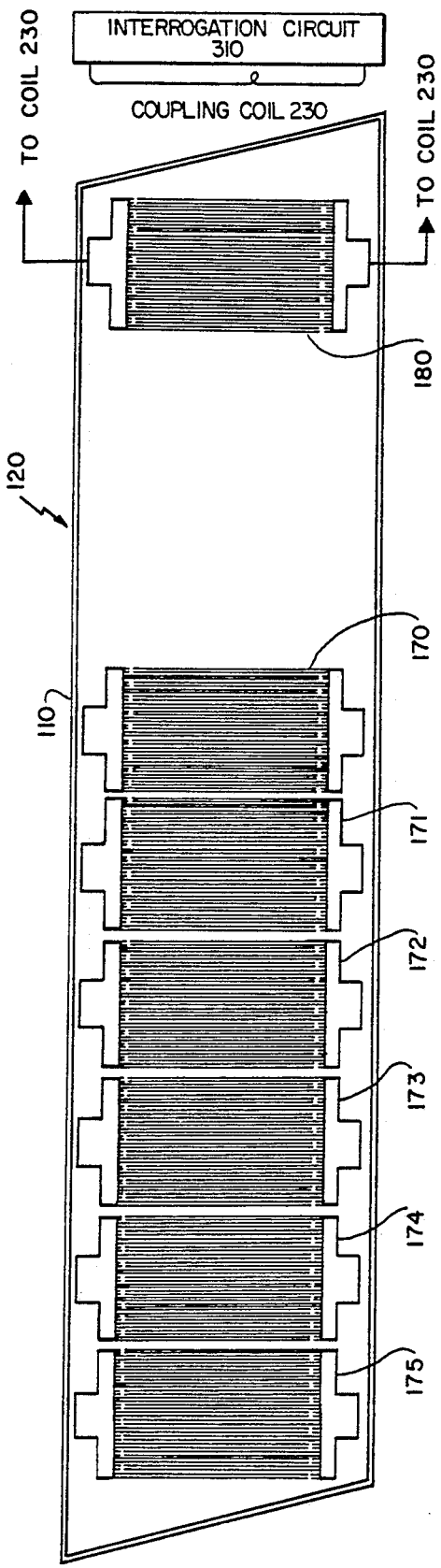
FIG. 2 is a plan view of a transponder constructed in accordance with the invention including a plurality of switchable transducers.

Another embodiment of the present invention is illustrated in FIG. 2. Here is shown a transponder 120 with one transducer 180 and six switchable reflectors 170, 171, 172, 173, 174 and 175. Each switchable reflector is connected to a switch, not shown, by a twisted pair of plastic insulated #22 wire of length 7.5 cm (Experimentation has shown that twisted pairs up to 15 cm length may be used without degradation of signals.) The substrate 11 is Y-cut Z-propagating lithium niobate. Lithium niobate was chosen for its high coupling coefficient; the YZ cut was chosen for its ruggedness. The electrode spacings were chosen so that the fundamental frequency of the transducers was 44.3 MHz. The use of low frequencies below 100 MHz and preferably below 50 MHz is preferred since low cost electronic circuitry and switches can be used. Moreover, simple photolithographic techniques can be used to manufacture the SAW transponders (typical linewidths = 10 microns).

Figure 4:
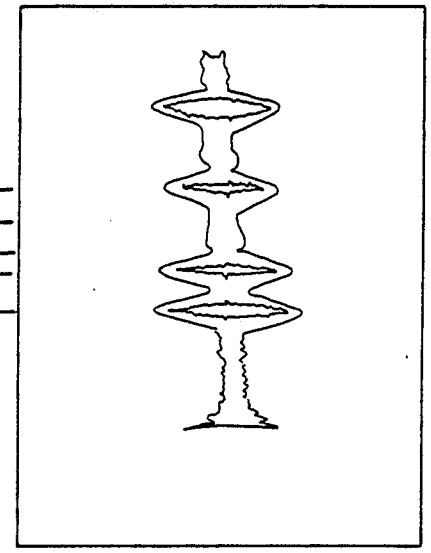
FIG. 4 is a photographic view of an electrical response from the SAW device illustrated in FIG. 2 with four switchable transducers in a reflecting state.
Figure 3:
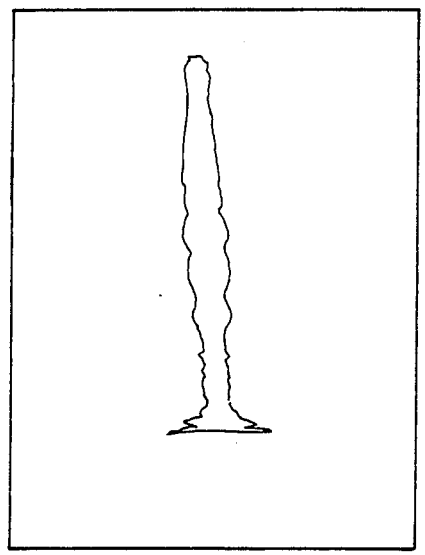
FIG. 3 is a photographic view of an electrical response from the SAW device illustrated in FIG. 2 with all the switchable transducers in a non-reflective state.

Sample voltages from the pickup coil, not shown, coupled to coil 230 attached to transducer 180 in FIG. 2 are shown in FIGS. 3 and 4. In FIG. 3, all switches are closed. In FIG. 4, four switches (connected to switchable reflectors 170, 171, 173 and 175) are open, yielding four readily detectable pulses. These pulses can be detected, and decoded by electronic circuitry 310 shown in FIG. 8 of, and described in U.S. patent application, Ser. No. 07/483,349.

In the preferred embodiment electrodes of the transducers are spaced at quarter acoustic-wavelengths, so that reflection from individual electrodes is subject to destructive interference and is completely cancelled. When the reflector transducer is open circuited, the incoming interrogating SAW causes buildup of voltage across the transducer, which in turn causes re-radiation of SAW's in both directions; the re-radiation towards the interrogating transducer constitutes partial reflection. This phenomenon is known as regeneration. When the reflector-transducer is shorted, this voltage cannot build up and no reflection occurs.

The switches, not shown, which respectively open or close the opposite line ends of each transducer 170 through 175 are associated with the remote devices, and thus provide the means to control or interrogate these devices. These switches modulate the reflective nature of the transducers which can be sensed by the electronic circuit.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the present invention, what is desired to be protected by Letters Patent is presented by the following appended claims.

What is claimed is:

1. An interrogation device supported in an automotive vehicle and operatively connected by means of a coil to a surface acoustical wave apparatus for interrogating the operative status of remote electronically operative automobile devices that are electrically isolated from said interrogation device by reason of said coil, comprising:
   a medium having means defining a surface acoustical wave path;
   an interface transducer carried by said medium for converting electromagnetic energy to surface acoustical waves, and for receiving reflected surface acoustical waves and converting said reflected surface acoustical waves to electromagnetic energy;
   interrogation means operatively connected to said interface transducer through a coil, for receiving electromagnetic energy from said interface transducer as a function of the operative status of electrically isolated, electronically operative automotive devices; and a plurality of programmable, spaced-apart, normally non-reflective transducers disposed along said surface acoustical wave path and positioned to receive surface acoustical waves from said interface transducer, said non-reflective transducers each operatively connected to and respectively programmable by a remotely located automotive device to become reflective and to reflect surface acoustical waves back to said interface transducer for converting the reflected waves to electromagnetic energy as a function of an operative state of each of said automotive devices.

2. The interrogation device of claim 1, wherein each programmable transducer is caused to become reflective of surface acoustical waves by means of a respective switch, each of said programmable transducers having opposite line ends that are normally electrically coupled together by respective ones of said switches to provide a non-reflective state.

3. The interrogation device of claim 1, wherein each of said programmable transducers has a plurality of split lines arranged transversely to said surface acoustical wave path.

4. The interrogation device of claim 1, comprising a time domain reflectometry circuit.

5. The interrogation device of claim 1, including a circuit that can differentiate between differences in electromagnetic energies produced by respective, reflected acoustical waves.

6. The interrogation device of claim 1, wherein each of said automotive devices is multiplexed.

7. The interrogation device and surface acoustical wave apparatus of claim 1, wherein digital information representative of the operative status of remote automotive devices is transmitted through a single transmission line disposed along a steering column, said single transmission line coupled to one of a pair of inductive coils operatively connected to said interrogation device.

8. The interrogation device of claim 1, wherein said medium comprises a piezoelectric substrate.

9. The interrogation device of claim 8, wherein said piezoelectric substrate comprises lithium niobate.

10. A multiplexed, interrogation device and surface acoustical wave apparatus combination for interrogating a number of switches coupled to a plurality of switchable transducers supported by said surface acoustical wave apparatus to determine the operational status of remote, electronically operative devices that are electrically isolated from said interrogation device, comprising:
   a surface acoustical wave medium having a surface acoustical wave path;
   an interface transducer disposed along said surface acoustical wave path for converting electromagnetic energy to surface acoustical waves and reflected surface acoustical waves back into electromagnetic energy;
   an interrogation device operatively coupled to said interface transducer disposed along said surface acoustical wave path; and
   a plurality of switchable transducers disposed along said surface acoustical wave path spaced apart from said interface transducer, said switchable transducers each being respectively switchable by a corresponding switch, and operative between two operative states, a first state being normally non-reflective to surface acoustical waves, and a second state being reflective thereto, each of said two states being a function of a different operative state of a respective, remote, electronically operative device connected to each respective switchable transducer through said corresponding switch.

11. The multiplexed, surface acoustical wave apparatus and interrogation device combination of claim 10, wherein said interrogation device comprises a time domain reflectometry circuit.

12. The multiplexed, surface acoustical wave apparatus and interrogation device combination of claim 11, wherein said interrogation device comprises a circuit that can differentiate between differences in electromagnetic energies produced by respective, reflected acoustical waves.

13. The multiplexed, interrogation device and surface acoustical wave apparatus combination of claim 10, wherein said surface acoustical wave medium comprises a piezoelectric substrate.

14. The multiplexed, interrogation device and surface acoustical wave apparatus combination of claim 13, wherein said piezoelectric substrate comprises lithium niobate.

15. The multiplexed, interrogation device and surface acoustical wave apparatus combination of claim 10, wherein each switchable transducer comprises normally closed line ends that are opened by a respective switch to provide said respective switchable transducer reflections of surface acoustical waves.

16. The multiplexed, interrogation device and surface acoustical wave apparatus combination of claim 10 for use in an automotive electrical system.

17. A method of controlling or interrogating a number of remote, electrically isolated devices in an electrical system by means of a surface acoustical wave apparatus having a coded sequence of programmable transducers, each of which is respectively associated with a remote device in said electrical system, said method comprising the steps of:
   (a) programming select ones of said programmable transducers to provide a means to control or interrogate certain ones of said remote devices; and
   (b) multiplexing said surface acoustical wave apparatus, whereby each remote device can be controlled or interrogated over a single cable.

18. The method of claim 17, wherein said electrical system is disposed within an automobile and said surface acoustical wave apparatus is carried upon a steering wheel column thereof.

19. The method of claim 17, further comprising the step of:
   (c) programming said select ones of said programmable transducers to be operative in one of two states, a first, wave reflective state, and a second, wave non-reflective state.

20. The method of claim 19, wherein said programmable transducers are normally in said second, wave non-reflective state.

* * * * *